United States Patent
Yagi et al.

(10) Patent No.: US 9,995,383 B2
(45) Date of Patent: Jun. 12, 2018

(54) HYDRAULIC SYSTEM OF VEHICLE TRANSMISSION DEVICE

(71) Applicant: Honda Motor Co.,Ltd., Tokyo (JP)

(72) Inventors: Noriyuki Yagi, Saitama (JP); Yoshinori Tanaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days. days.

(21) Appl. No.: 15/456,578

(22) Filed: Mar. 13, 2017

(65) Prior Publication Data

US 2017/0268658 A1 Sep. 21, 2017

(30) Foreign Application Priority Data

Mar. 17, 2016 (JP) ................. 2016-053939

(51) Int. Cl.
*F16H 61/00* (2006.01)
*F04B 49/00* (2006.01)

(52) U.S. Cl.
CPC ....... *F16H 61/0021* (2013.01); *F04B 49/002* (2013.01); *F16H 61/0009* (2013.01); *F16H 2061/0037* (2013.01)

(58) Field of Classification Search
CPC ............... F16H 61/0021; F16H 1/0009; F16H 2061/0037; F16H 61/0265; F16H 57/0446; F16H 57/0445; F16H 57/0412; F16H 57/0413; F16H 57/0415; F16H 57/0439; F16H 57/0441; F16H 57/0482; F16H 61/702; F04B 49/002; F04B 49/065; F04B 2201/1202
USPC ............................................ 65/41; 123/41.1
See application file for complete search history.

(56) References Cited

U.S. PATENT DOCUMENTS

| | | | | |
|---|---|---|---|---|
| 3,645,643 A * | 2/1972 | King, III | ................. | F01D 11/04 415/111 |
| 5,220,892 A * | 6/1993 | Boemer | ................... | F01M 1/16 123/196 AB |
| 6,360,702 B1 * | 3/2002 | Osada | ................... | F28D 7/0066 123/196 AB |
| 8,205,427 B2 * | 6/2012 | Schwarz | ................. | F01D 25/08 165/41 |
| 8,631,772 B2 * | 1/2014 | Gooden | ................. | B60K 11/06 123/196 AB |
| 8,978,613 B2 * | 3/2015 | Will | ....................... | F01M 5/001 123/196 R |

(Continued)

FOREIGN PATENT DOCUMENTS

JP    4179364    11/2008

*Primary Examiner* — Mohammad M Ali
(74) *Attorney, Agent, or Firm* — JCIPRNET

(57) ABSTRACT

A hydraulic system of vehicle transmission device is provided. A heat exchanger configured downstream is used to cool working oil discharged from a torque converter, and the working oil is supplied, as lubricating oil, to a lubricating system hydraulic circuit. On the other hand, excess oil flowing out of a regulator valve for regulating line pressure returns to an input side of an oil pump through a recycle oil path. A bypass oil path is disposed in a manner of branching from the recycle oil path and connecting to an input side of the heat exchanger. A control mechanism is disposed, and when hydraulic pressure at the side of the recycle oil path is higher than that at the side of the heat exchanger, the bypass oil path is opened to guide oil at the side of the recycle oil path to the input side of the heat exchanger.

6 Claims, 2 Drawing Sheets

(56) References Cited

U.S. PATENT DOCUMENTS

| | | | |
|---|---|---|---|
| 8,978,824 B2* | 3/2015 | Czechowski | F04D 13/12 |
| | | | 184/11.2 |
| 8,991,179 B2* | 3/2015 | Berger | F01K 15/02 |
| | | | 60/618 |
| 9,109,464 B2* | 8/2015 | Suciu | F01D 25/20 |
| 9,121,335 B2* | 9/2015 | Quiring | F01P 7/14 |
| 9,174,612 B2* | 11/2015 | Ruona | B60T 10/02 |
| 2008/0051251 A1* | 2/2008 | Ogata | F16H 61/0021 |
| | | | 477/52 |
| 2009/0232673 A1* | 9/2009 | Reisch | F16H 57/0434 |
| | | | 417/364 |

\* cited by examiner

HYDRAULIC SYSTEM OF VEHICLE TRANSMISSION DEVICE

CROSS-REFERENCE TO RELATED APPLICATION

This application claims the priority benefit of Japan application serial no. 2016-053939, filed on Mar. 17, 2016. The entirety of the above-mentioned patent application is hereby incorporated by reference herein and made a part of this specification.

BACKGROUND OF THE INVENTION

1. Field of the Invention

The present invention relates to a hydraulic system of a vehicle transmission device, and in particular, to improvement on cooling performance of Automatic Transmission Fluid (ATF) oil in a high speed area.

2. Description of Related Art

In the following Patent Document 1, the following structure is expressed for a vehicle transmission device: after discharged oil of a torque converter in a lock-up clutch separation/engagement state is guided, via a first oil path, to a cooler for cooling, the cooled oil is supplied to a lubricating path; after excess oil from a regulator valve is guided, via a second oil path, to the cooler for cooling, the cooled oil is supplied to the lubricating path, and the regulating oil regulates hydraulic pressure discharged from an oil pump. Orifices are disposed in the first oil path and the second oil path respectively, to limit flows guided from respective oil paths to the cooler respectively. In addition, the excess oil from the regulator valve returns to the upstream of the oil pump, and the flow guided from the second oil path to the cooler is limited through the orifice, thus ensuring the flow of the excess oil returning to the upstream of the oil pump.

DOCUMENT OF THE PRIOR ART

Patent Document

Patent Document 1: Japanese Patent Gazette No. 4179364

SUMMARY OF THE INVENTION

However, if an engine speed reaches a rotation speed which is equal to or greater than a predetermined speed (e.g., 3000 rpm), the flow of a working oil supplied to a torque converter may become fixed, which thus has the following problem: in a higher rotation speed and higher vehicle speed area, it is impossible to increase the flow supplied from a discharge oil path of the torque converter to the cooler, and the cooling is insufficient. For Patent Document 1, as an orifice is disposed in the second oil path via which the excess oil is guided to the cooler, in the higher rotation speed and higher vehicle speed area, the flow guided to the cooler may be limited, and insufficient cooling of the working oil or lubricating oil in the higher rotation speed and higher vehicle speed area cannot be solved.

The present invention is an invention formed in view of the content, directed to cooling the working oil or lubricating oil efficiently in a high rotation speed and high vehicle speed area.

The present invention is a hydraulic system of a vehicle transmission device, including: an oil pump driven with a rotary shaft of the vehicle transmission device in a linked way; a regulator valve that regulates hydraulic pressure discharged from the oil pump and supplies the hydraulic pressure to a hydraulic circuit; and a heat exchanger disposed in a predetermined position of the hydraulic circuit and cooling oil passing through the position, wherein the hydraulic system of a vehicle transmission device includes: a bypass oil path branched from a recycle oil path and connected to an input side of the heat exchanger, the recycle oil path allowing excess oil to flow out of the regulator valve and return to an input side of the oil pump; and a control mechanism that opens the bypass oil path when hydraulic pressure at a side of the heat exchanger is lower than hydraulic pressure at a side of the recycle oil path to guide oil at the side of the recycle oil path to the input side of the heat exchanger.

According to the present invention, in a high rotation speed and high vehicle speed area, when hydraulic pressure at an upstream side of the heat exchanger reaches an upper limit, with increase of the excess oil flowing out of the regulator valve, the hydraulic pressure at the side of the heat exchanger is relatively lower than that at the side of the recycle oil path, and thus the bypass oil path is opened via the control mechanism, to guide the oil at the side of the recycle oil path to the heat exchanger. Thus, in the high rotation speed and high vehicle speed area, the oil quantity cooled by the heat exchanger can be increased, thus improving the cooling performance of the working oil or lubricating oil.

DESCRIPTION OF THE EMBODIMENTS

Figure 1:
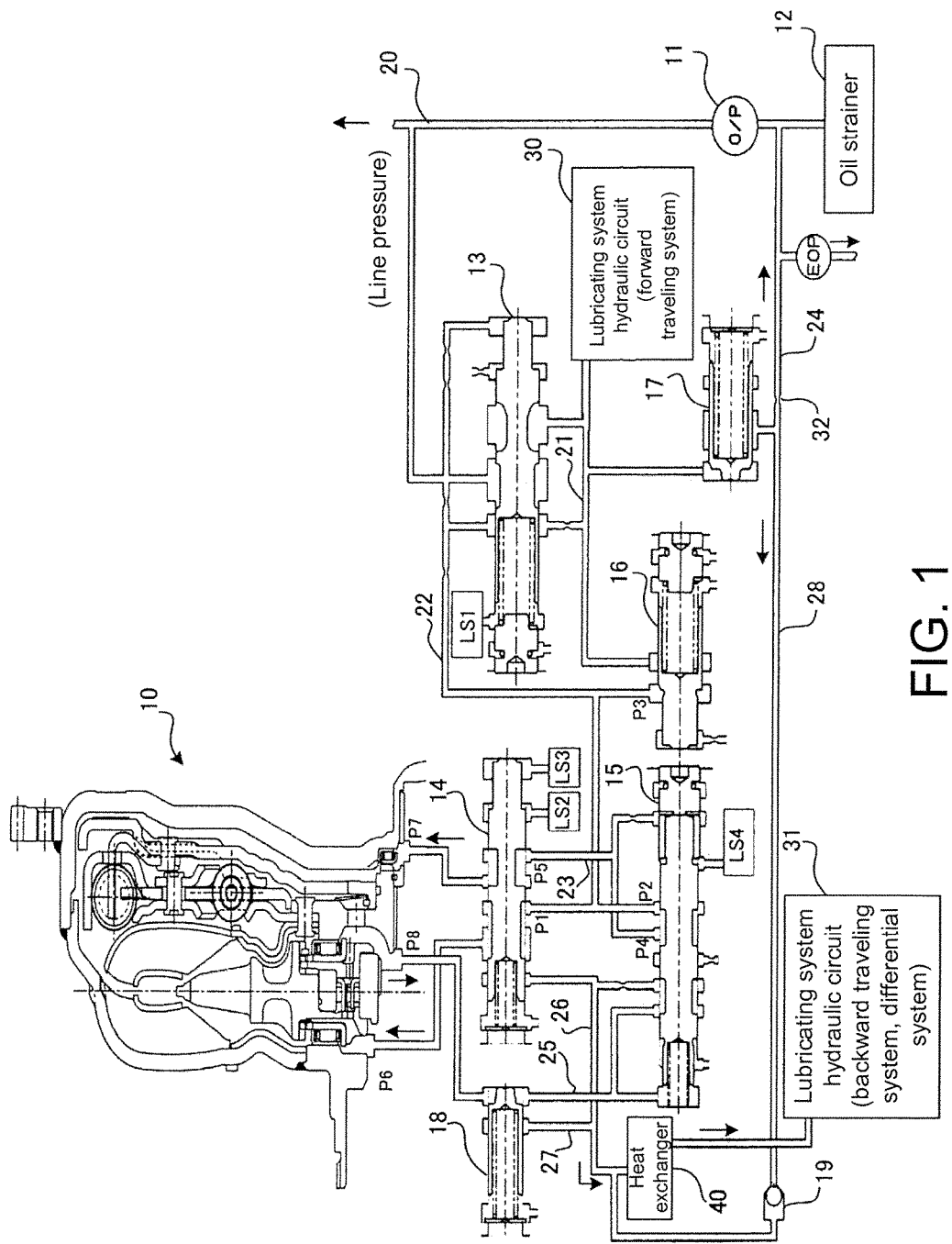
FIG. 1 is a diagram of a hydraulic circuit of a hydraulic system of a vehicle transmission device according to an embodiment of the present invention.

FIG. 1 is a diagram of a hydraulic circuit of a hydraulic system of a vehicle transmission device according to an embodiment of the present invention, which, as an example, indicates a hydraulic circuit associated with a torque converter 10 used to transfer rotation of an engine to a transmission. An oil pump 11 sucks up oil from an oil strainer 12, and discharges the oil to an oil path 20. A regulator valve 13 is disposed at a vent side of the oil pump 11. As is well-known, pressure of the oil discharged from the vent of the oil pump 11 is adjusted through the regulator valve 13, and thus line pressure adjusted to fixed pressure is supplied to the oil path 20. The pressure adjustment in the regulator valve 13 is controlled by a linear solenoid LSI. Excess oil flowing out of the regulator valve 13 is supplied to a lubricating system hydraulic circuit 30 through the oil path 21, and is used as lubricating oil. The lubricating system hydraulic circuit 30, for example, supplies lubricating oil (forward travel lubricating path) for a forward travel gear and clutch system in the transmission, and the forward travel gear and clutch system needs enough lubricating oil due to high operating rate. Thus, it is set that enough excess oil is supplied to the oil path 21.

Pressure oil (with a line pressure) supplied to the oil path 20 is supplied, through an oil path 22, to a valve port P1 of a lock-up clutch shift valve 14, a valve port P2 of a lock-up clutch control valve 15, and a valve port P3 of a torque relief valve 16. Pressure oil output from a valve port P4 of the lock-up clutch control valve 15 is supplied, through an oil path 23, a valve port P5 of the lock-up clutch shift valve 14.

The lock-up clutch shift valve 14 is controlled by linear solenoids LS2 and LS3, and the following working oil is supplied to valve ports P6 and P7 of the torque converter 10. The working oil is used to set the lock-up clutch of the torque converter 10 as ON (engaged) or OFF (separated). The lock-up clutch control valve 15 is controlled by a linear solenoid LS4, and the hydraulic pressure supplied, through the oil path 23, to the lock-up clutch shift valve 14 is controlled. A torque converter relief valve 16 is opened when the hydraulic pressure of the oil path 22 is equal to or greater than a predetermined value, to make the remaining oil flow into the oil path 21.

Moreover, when the oil path 21, as a lubricating oil supply source, is connected to a lubricating oil relief valve 17 and the hydraulic pressure of the oil path 21 is equal to or greater than a set value, the relief valve 17 is opened, to guide the excess oil to the recycle oil path 24. The recycle oil path 24 is connected to a suction inlet side of the oil pump 11, making part of the remaining oil, supplied to the lubricating system hydraulic circuit 30 as lubricating oil, in the excess oil flowing out of the regulator valve 13 is circulated again to the suction inlet side of the oil pump 11.

On the other hand, the working oil discharged from a valve port P8 of the torque converter 10 is cooled by a heat exchanger 40 disposed downstream. That is, the working oil discharged from the valve port P8 of the torque converter 10 is discharged, via a torque converter check valve 18, through an oil path 25, and through the lock-up clutch control valve, to an oil path 26. The torque converter check valve 18 makes, when the hydraulic pressure of the working oil discharged from the valve port P8 of the torque converter 10 is equal to or greater than a predetermined value, the excess oil flow into an oil path 27. The excess oil discharged to the oil path 26 and the oil path 27 is cooled due to passing through the heat exchanger 40, and is supplied, as lubricating oil, to another lubricating system hydraulic circuit 31. The lubricating system hydraulic circuit 31, for example, supplies lubricating oil for a backward travel gear and clutch system and a differential gear and clutch system in the transmission. For example, the heat exchanger 40 cools the excess oil through heat exchange with cooling water of a water cooled engine. Moreover, the lubricating oil used by the lubricating system hydraulic circuits 30 and 31 finally falls into an oil pan, and is sucked up by the oil pump 11 via the oil strainer 12.

Moreover, the input side of the heat exchanger 40 is connected to a bypass oil path 28 branched from the recycle oil path 24, and a one-way valve 19 is disposed midway on the bypass oil path 28. Besides, an orifice 32 for limiting the flow of recycle oil returning to the oil pump 11 is disposed in the recycle oil path 24, and the bypass oil path 28 is branched from the recycle oil path 24 at an upstream side of the orifice 32. The one-way valve (check valve) 19 is opened when the pressure of the hydraulic pressure at the side of the recycle oil path 24 is greater than that at the input side of the heat exchanger 40, to guide the oil at the side of the recycle oil path 24 to the input side of the heat exchanger 40. Through the orifice 32 disposed on the recycle oil path 24, a working area of the one-way valve 19 being opened is set as a high rotation speed area of the engine (e.g., the rotation speed is equal to or greater than 3000 rpm). Therefore, the one-way valve 19 and the orifice 32 function as the following control mechanism: the control mechanism opens the bypass oil path 28 when, in a predetermined high rotation speed area, the hydraulic pressure at the side of the heat exchanger 40 is lower than that at the side of the recycle oil path 24, to guide the oil at the side of the recycle oil path 24 to the input side of the heat exchanger 40.

The conventional device has a problem of insufficient cooling. For the conventional device, if the engine speed reaches a rotation speed which is equal to or greater than a predetermined rotation speed (e.g., 3000 rpm), the flow of the working oil supplied to the torque converter 10 becomes fixed, and thus, in a higher rotation speed and higher vehicle speed area, it is impossible to increase the flow supplied from the discharge valve port P8 of the torque converter 10 to the heat exchanger 40, and the bypass oil path 28 and the control mechanism are not provided. With respect to this, in the present invention, the above problem is solved by providing the bypass oil path 28 and the control mechanism (a one-way valve 19 and an orifice 32). That is, the throttling quantity of the orifice 32 is set such that, when the engine speed reaches a speed which is higher than a predetermined threshold (e.g., 3000 rpm) where the flow of the oil supplied from the discharge valve port P8 of the torque converter 10 to the heat exchanger 40 is ultimate, the pressure of the excess oil of the recycle oil path 24 at the upstream side of the orifice 32 is greater than the pressure of the oil supplied from the discharge valve port P8 of the torque converter 10 to the heat exchanger 40. Thus, when the engine speed is in a low speed area which is equal to or less than a predetermined threshold (e.g., 3000 rpm), the one-way valve 19 is closed and the oil is not supplied to the heat exchanger 40 from the bypass oil path 28. However, when the engine speed is in a high speed area above the predetermined threshold (e.g., 3000 rpm), the one-way valve 19 is opened and the excess oil is supplied to the heat exchanger 40 from the bypass oil path 28. That is, the higher the speed area is, the higher the rotation speed of the oil pump 11 is, and thus the oil quantity of the excess oil flowing out to the recycle oil path 24 increases. By supplementing the excess oil increased in this manner to the heat exchanger 40, it can efficiently cool the working oil and the lubricating oil with higher temperatures in the higher speed area. Besides, the remaining oil of the lubricating system hydraulic circuit 30 for forward travel supplied with a large amount of lubricating oil (forward travel lubricating path) is supplied to the recycle oil path 24, and is supplied to the bypass oil path 28 from the recycle oil path 24, and thus the excess oil can be supplemented to the heat exchanger 40 efficiently.

Figure 2:
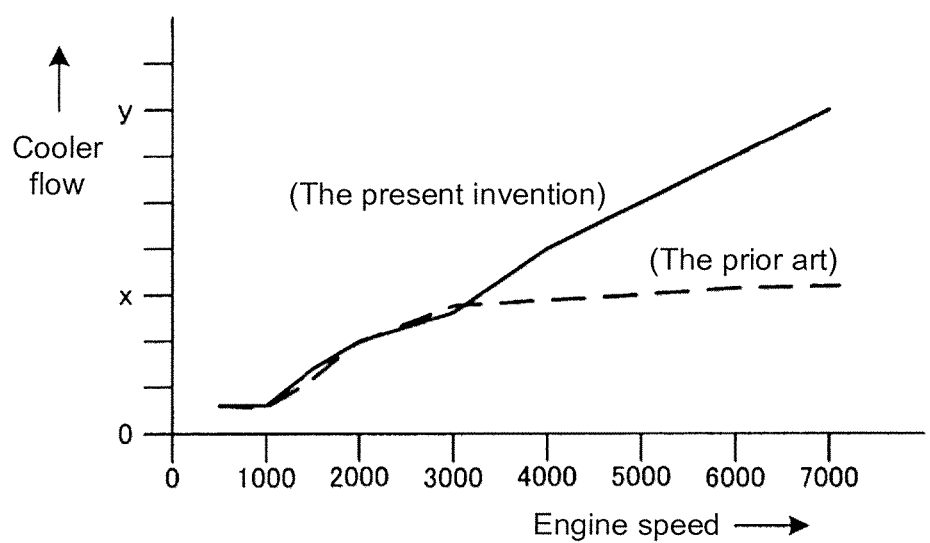
FIG. 2 is a curve diagram of differences between cooling performance of the present invention and the prior art.

FIG. 2 is a curve diagram of differences between cooling performance of the present invention and the prior art. The horizontal axis is the engine speed, the vertical axis is the oil quantity (cooler flow) flowing to the input side of the heat exchanger 40, the solid line indicates characteristics of the engine speed of the present invention vs. cooler flow, and the dotted line indicates characteristics of the engine speed of the prior art vs. cooler flow. As shown by the dotted line, in the past, if the engine speed exceeded the predetermined value (e.g., 3000 rpm), the oil quantity (cooler flow) flowing to the heat exchanger 40 reaches the limit. With respect to this, according to the present invention, the throttling quantity of the orifice 32 is set as a flow x corresponding to the predetermined threshold (e.g., 3000 rpm) of the engine speed, if the pressure of the excess oil of the recycle oil path 24 at the upstream side of the orifice 32 is over the set flow x, the one-way valve 19 is opened, and thus the excess oil is supplemented to the input side of the heat exchanger 40 through the bypass oil path 28. As shown by the solid line, the oil quantity (cooler flow) flowing to the heat exchanger 40 rises with rising of the engine speed.

When, in the predetermined high speed area, the hydraulic pressure at the side of the heat exchanger 40 is lower than that at the side of the recycle oil path 24, the bypass oil path 28 is opened, and the control mechanism that guides the oil at the side of the recycle oil path 24 to the input side of the heat exchanger 40 is not limited to the combination of the one-way valve 19 and the orifice 32, which may be transformed properly. For example, a relief valve may also be used. Besides, not limited to being disposed at the heat exchanger 40 at the discharge valve port side of the torque converter 10, the upstream of the bypass oil path 28 may also be connected to an input side of a heat exchanger disposed in another position of e hydraulic circuit.

What is claimed is:

1. A hydraulic system of a vehicle transmission device, comprising:
   an oil pump driven with a rotary shaft of the vehicle transmission device in a linked way;
   a regulator valve that regulates hydraulic pressure discharged from the oil pump and supplies the hydraulic pressure to a hydraulic circuit; and
   a heat exchanger disposed in a predetermined position of the hydraulic circuit and cooling oil passing through the position,
   wherein the hydraulic system of a vehicle transmission device comprises:
   a bypass oil path branched from a recycle oil path and connected to an input side of the heat exchanger, the recycle oil path allowing excess oil to flow out of the regulator valve and return to an input side of the oil pump; and
   a control mechanism that opens the bypass oil path when hydraulic pressure at a side of the heat exchanger is lower than hydraulic pressure at a side of the recycle oil path to guide oil at the side of the recycle oil path to the input side of the heat exchanger.

2. The hydraulic system of a vehicle transmission device according to claim 1, wherein the control mechanism comprises a one-way valve disposed in the bypass oil path.

3. The hydraulic system of a vehicle transmission device according to claim 2, wherein the control mechanism further comprises an orifice, setting flow from the recycle oil path back to the input side of the oil pump, the bypass oil path is branched from the recycle oil path on an upstream side of the orifice, and an oil quantity exceeding the flow set by the orifice is diverted to the bypass oil path from the recycle oil path.

4. The hydraulic system of a vehicle transmission device according to claim 1, wherein the excess oil flowing out of the regulator valve is guided to a predetermined lubrication path of the vehicle transmission device, and remaining oil for the predetermined lubrication path is supplied to the recycle oil path and then supplied to the bypass oil path from the recycle oil path.

5. The hydraulic system of a vehicle transmission device according to claim 2, wherein the excess oil flowing out of the regulator valve is guided to a predetermined lubrication path of the vehicle transmission device, and remaining oil for the predetermined lubrication path is supplied to the recycle oil path and then supplied to the bypass oil path from the recycle oil path.

6. The hydraulic system of a vehicle transmission device according to claim 3, wherein the excess oil flowing out of the regulator valve is guided to a predetermined lubrication path of the vehicle transmission device, and remaining oil for the predetermined lubrication path is supplied to the recycle oil path and then supplied to the bypass oil path from the recycle oil path.

* * * * *